United States Patent [19]

Bekele

[11] Patent Number: 6,045,924
[45] Date of Patent: *Apr. 4, 2000

[54] FILM FROM A VINYLIDENE CHLORIDE COPOLYMER CONTAINING BLEND

[75] Inventor: Solomon Bekele, Taylors, S.C.

[73] Assignee: Cryovac, Inc., Duncan, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,748

[22] Filed: Feb. 12, 1997

Related U.S. Application Data

[63] Continuation-in-part of application No. 08/666,152, Jun. 19, 1996, abandoned.

[51] Int. Cl.[7] ........................................ B32B 27/30
[52] U.S. Cl. ............... 428/518; 428/522; 428/35.4; 428/36.7; 428/515; 428/516
[58] Field of Search ............... 525/64, 65, 66, 525/74, 78, 80; 428/515, 516, 517, 518, 519, 520, 521, 522, 525, 910, 35.4, 36.7

[56] References Cited

U.S. PATENT DOCUMENTS

| | | | |
|---|---|---|---|
| 3,741,253 | 6/1973 | Brax et al. | 138/137 |
| 3,891,008 | 6/1975 | D'Entremont | 138/146 |
| 3,903,198 | 9/1975 | Wei | 525/80 |
| 4,048,428 | 9/1977 | Baird, Jr. et al. | 526/343 |
| 4,064,296 | 12/1977 | Bornstein et al. | 428/35 |
| 4,170,716 | 10/1979 | Hilbert et al. | 179/1 |
| 4,278,738 | 7/1981 | Brax et al. | 428/515 |
| 4,284,458 | 8/1981 | Schirmer | 156/244.12 |
| 4,551,380 | 11/1985 | Schoenberg | 428/218 |
| 4,643,943 | 2/1987 | Schoenberg | 428/339 |
| 4,686,148 | 8/1987 | Havens | 428/520 |
| 4,698,111 | 10/1987 | Havens | 156/244.11 |
| 4,724,185 | 2/1988 | Shah | 428/339 |
| 4,755,403 | 7/1988 | Ferguson | 428/35 |
| 4,770,731 | 9/1988 | Ferguson | 156/229 |
| 4,839,235 | 6/1989 | Shah | 128/516 |
| 4,879,430 | 11/1989 | Hoffman | 428/35.1 |
| 5,004,647 | 4/1991 | Shah | 428/349 |
| 5,202,188 | 4/1993 | Bekele | 428/414 |
| 5,206,075 | 4/1993 | Hodgson, Jr. | 428/216 |
| 5,231,139 | 7/1993 | Michel | 525/208 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |

FOREIGN PATENT DOCUMENTS

| | | |
|---|---|---|
| 0968689 | 6/1975 | Canada . |
| 0029316 | 10/1980 | European Pat. Off. . |
| WO 90/03414 | 4/1990 | WIPO . |
| WO 91/08260 | 6/1991 | WIPO . |
| WO 93/03093 | 2/1993 | WIPO . |
| WO 97/14554 | 10/1996 | WIPO . |

OTHER PUBLICATIONS

ASTM—D 2732—83, Standard Test Method for Unrestrained Linear Thermal Shrinkage of Plastic Film and Sheeting, pp. 368–371, (Sep. 1989).

Wild et al., "Determination of Branching Distributions in Polyethylene and Ethylene Copolymers" Journal of Polymer Science: Polymer Physics Edition, vol. 20, 441–455 (1982).

Encyclopedia of Polymer Science and Engineering, 2d ed., vol. 1, pp. 232–269 (1985).

*Primary Examiner*—Paul Thibodeau
*Assistant Examiner*—D Lawrence Tarazano
*Attorney, Agent, or Firm*—Daniel B. Ruble; David G. Burleson; Rupert B. Hurley, Jr.

[57] ABSTRACT

A film includes a layer derived from PVDC-containing composition having properties such as good thermal stability, enhanced extrudability, improved oxygen barrier properties, and reduced stickiness to metal surfaces. The composition includes a three components: a vinylidene chloride-containing polymer, a processing aid polymer, and a material useful for preventing the degradation of PVDC.

18 Claims, No Drawings

FILM FROM A VINYLIDENE CHLORIDE COPOLYMER CONTAINING BLEND

CROSS-REFERENCE TO RELATED APPLICATIONS

This is a continuation-in-part of U.S. patent application Ser. No. 08/666,156, filed Jun. 19, 1996, now abandoned, the disclosure of which is incorporated herein by reference.

BACKGROUND OF THE INVENTION

1. Field of the Invention

The present invention relates to films made from vinylidene chloride polymers or copolymers, especially films suitable for the packaging of food products, such as meat. More specifically, the present invention relates to films having a poly(vinylidene chloride) layer that acts as an $O_2$-barrier.

2. Background Information

Thermoplastic packaging films made of vinylidene chloride copolymer, often referred to as "saran" or "PVDC", have been used for the packaging of food products (e.g., fresh and processed meats) as well as a variety of other items.

Multilayer films including at least one layer containing PVDC have been produced by coextrusion, lamination, and extrusion coating. Oriented, heat-shrinkable films comprising PVDC also have been produced. Vinylidene chloride has been copolymerized with vinyl chloride, methyl methacrylate, and/or other suitable copolymers. Stabilizers and HCl scavengers have been blended with PVDC.

Nevertheless, provision of a PVDC composition capable of providing a packaging film with a lower $O_2$-transmission rate (OTR), so that a lesser amount of the PVDC composition is needed to provide the desired $O_2$-barrier property, would be desirable. Provision of a PVDC composition having an improved thermal stability, so that the composition has less tendency to degrade during extrusion, also would be desirable. Provision of a molten PVDC composition which can be extruded at higher speeds also would be desirable. Finally, provision of a PVDC composition having a reduced stickiness to processing equipment would also be desirable. Such a composition would tend to reduce disruptions during extrusion caused by degradation of PVDC in the extruder, which necessitates purging and/or cleaning of the extrusion system.

SUMMARY OF THE INVENTION

Briefly, the present invention provides a film including one or more layers, at least one of the layers being derived from a blend of at least three components. The first component is a polymer including mer units derived from vinylidene chloride. The second component is a processing aid polymer which includes mer units derived from a $C_1$–$C_{12}$ alkyl ester of (meth)acrylic acid and mer units derived from one or more monomers having the general formula $CH_2=CR^1C(O)R^2$. (In this formula, $R^1$ is H or $CH_3$, and $R^2$ is OH, $O(CH_2)_nR^3$, or $NH(CH_2)_nOH$ in which n is an integer from 1 to 8 inclusive and $R^3$ is an amino, hydroxyl, or oxirane group.) The third component is an HCl-scavenging compound and/or a dienophile.

This blend tends to not degrade upon being subjected to conditions of high shear, such as those experienced in an extruder. The excellent thermal stability of the PVDC blend is believed to be due to the fact that it generates less heat during high shear conditions, due to reduction of mechanical shear and a reduced tendency of the material to stick to processing equipment. These reductions are believed to be a consequence of the presence of the processing aid copolymer.

Moreover, in the production of film including a PVDC $O_2$-barrier layer, such a blend can provide the layer with increased $O_2$-barrier properties per amount of PVDC present in the film. The improved $O_2$-barrier properties are believed to be the result of a reduction or elimination of conventional liquid stabilizers in the blend. Conventional liquid stabilizers can be reduced or eliminated due to the lubricating effects of the processing aid copolymer. As a result, in the production of film, extrusion speed and orientation rate can be maintained while the OTR of the film is improved. Alternatively, extrusion speed, orientation rate, and the OTR of the film can all be maintained while providing a PVDC-containing layer of reduced thickness.

Although the film of the present invention can include just a single layer (i.e., a layer derived from the above-described blend), it preferably includes two or more layers. A preferred multilayer film structure according to the present invention has at least four layers. Such a film includes a seal layer, a bulk layer, an $O_2$-barrier layer derived from the above-described blend, and an abuse layer. The film layers preferably are present in the listed order.

Although the PVDC-containing layer can be an outer layer, preferably it is an inner layer of the film. If the composition is present in an inner film layer, preferably the multilayer film comprises outer surface layers that both include polymers including mer units derived from ethylene.

The film can be heat shrinkable or non-heat shrinkable. Where the film is heat shrinkable, it preferably has a total free shrink at 85° C. (185° F.) of from about 10 to 100%. Where the film is non-heat shrinkable, it preferably has a total free shrink at 85° C. (185° F.) of from about 1 to 9%. Such non-heat shrinkable films can be cast or blown.

Regardless of whether the film of the present invention is or is not heat shrinkable, it can be used to package a variety of products, particularly oxygen sensitive products.

The following definitions apply hereinroughout unless a contrary intention is expressly indicated:

"(meth)acrylic acid" includes both acrylic acid and/or methacrylic acid;

"(meth)acrylate" includes both acrylate and methacrylate;

"polymer" means the product of a polymerization reaction, and is inclusive of homopolymers, copolymers, terpolymers, tetrapolymers, etc.;

"copolymer" means a polymer formed by the polymerization reaction of at least two different monomers and is inclusive of random copolymers, block copolymers, graft copolymers, etc.;

"package" means one or more packaging materials (e.g., a film) configured around a product;

"film" is used in its most generic sense to include all plastic web materials, although those having a thickness of 0.25 mm or less are most preferred;

"inner layer" (or "internal layer") means any layer of a multilayer film having both of its principal surfaces directly adhered to other layers of the film;

"outer layer" means any layer of a film having one or none its principal surfaces directly adhered to another layer of the film;

"inside layer" means an outer layer of a multilayer film packaging a product which is closest to the product, relative to the other layers of the multilayer film;

"outside layer" means that layer of a multilayer film packaging a product which is farthest from the product relative to the other layers of the multilayer film;

"seal layer", "sealing layer", "heat seal layer", and "sealant layer" mean
  (a) with respect to lap-type seals, one or more outer film layer(s) (in general, up to the outer 75 μm (3 mils) of a film can be involved in the sealing of the film to itself or another layer) involved in the sealing of the film to itself, another film layer of the same or another film, and/or another article which is not a film, or
  (b) with respect to fin-type seals, an inside film layer of a package, as well as supporting layers within 75 μm (3 mils) of the inside surface of the innermost layer, involved in the sealing of the film to itself;

"seal" means a bonding of a first region of a film surface to a second region of a film surface created by heating (e.g., by means of a heated bar, hot air, infrared radiation, ultrasonic sealing, etc.) the regions to at least their respective seal initiation temperatures;

"barrier", when used in conjunction with films and/or film layers, means an ability to exclude one or more gases (e.g., $O_2$);

"abuse layer" (or "puncture resistant layer") means an outer film layer and/or an inner film layer which resists abrasion, puncture, and other potential causes of reduction of package integrity, as well as potential causes of reduction of package appearance quality;

"tie layer" means an inner film layer having the primary purpose of providing interlayer adhesion to adjacent layers that include otherwise nonadhering polymers;

"bulk layer" means any layer which has the purpose of increasing the abuse resistance, toughness, modulus, etc., of a multilayer film and generally comprises polymers that are inexpensive relative to other polymers in the film which provide some specific purpose unrelated to abuse resistance, modulus, etc.;

"lamination" and "laminate" (or "laminated film") mean the process, and resulting product, of the bonding of two or more film layers or other materials and include coextrusion as well as adhesive bonding;

"adhere" means,
  (a) when used in connection with two or more films, to bond the films to one another using a heat seal or other means such as, for example, a layer of adhesive between the films, or
  (b) when used in conncection with film layers, to bond a subject film layer to an object film layer, without a tie layer, adhesive, or other layer therebetween;

"between", when used in conjunction with a subject layer and two or more object layers, means both direct adherence of the subject layer to the two other layers it is between, as well as including a lack of direct adherence to either or both of the two other layers the subject layer is between, i.e., one or more additional layers can be imposed between the subject layer and one or more of the layers the subject layer is between;

"total free shrink" means the percent dimensional change in a 10 cm×10 cm specimen of film, when shrunk at 85° C. (185° F.), with the quantitative determination being carried out according to ASTM D 2732, as set forth in the 1990 *Annual Book of ASTM Standards,* vol. 08.02, 368–371, the entire disclosure of which is incorporated herein by reference;

"machine direction" means along the length of a film, i.e., in the direction of the film as it is formed during extrusion and/or coating; and "transverse direction" means across a film, i.e., the direction that is perpendicular to the MD.

DETAILED DESCRIPTION OF ILLUSTRATIVE EMBODIMENTS

The film of the present invention can include one or more layers that include an ethylene-containing polymer. The relatively recent advent of single site-type catalysts (e.g., metallocenes) necessitates further definitional clarification. Heterogeneous polymers are those having relatively wide variation in molecular weight and composition distribution. Polymers prepared with, for example, conventional Ziegler Natta catalysts are heterogeneous. Such polymers can be used in a variety of layers of the film of the present invention.

On the other hand, homogeneous polymers have relatively narrow molecular weight and composition distribution. Homogeneous polymers differ structurally from heterogeneous polymers in that they exhibit a relatively even sequencing of comonomers within a chain, a mirroring of sequence distribution in all chains, and a similarity of chain lengths, i.e., a narrower molecular weight distribution. Homogeneous polymers typically are prepared using metallocene or other single site-type catalysts. Homogeneous polymers also can be used in a variety of layers of the film of the present invention.

The term "ethylene/α-olefin copolymer" is intended to refer to heterogeneous materials such as low density polyethylene (LDPE), medium density polyethylene (MDPE), linear low density polyethylene (LLDPE), and very low and ultra low density polyethylene (VLDPE and ULDPE); as well as to homogeneous materials such as metallocene catalyzed Exact™ resins (Exxon Chemical Co.; Baytown, Tex.), substantially linear Affinity™ and Engage™ resins (Dow Chemical Co.; Midland, Mich.), and Tafmer™ linear resins (Mitsui Petrochemical Corp.; Japan). Both the heterogeneous polymers and homogeneous polymers referred to above generally include copolymers of ethylene and one or more α-olefins such as, for example, 1-butene, 1-hexene, 1-octene, etc.

Homogeneous ethylene/α-olefin copolymers can be characterized by one or more methods known to those of skill in the art, such as molecular weight distribution ($M_w/M_n$), composition distribution breadth index (CDBI), narrow melting point range, and single melt point behavior. The molecular weight distribution, also known as "polydispersity", can be determined by, for example, gel permeation chromatography. Homogeneous ethylene/α-olefin copolymers to be used in a layer of the film of the present invention preferably have an $M_w/M_n$ of less than 2.7; more preferably from about 1.9 to 2.5; still more preferably, from about 1.9 to 2.3.

The CDBI of homogeneous ethylene/α-olefin copolymers generally is greater than about 70 percent. CDBI is defined as the weight percent of copolymer molecules having a comonomer content within 50% (i.e., ±50%) of the median total molar comonomer content. CDBI can be determined by temperature rising elution fractionation as described by, for example, Wild et. al., *J. Poly. Sci.—Poly. Phys. Ed.,* vol. 20, 441 (1982). Linear polyethylene, which does not contain a comonomer, is defined to have a CDBI of 100%. CDBI determination clearly distinguishes homogeneous copolymers (CDBI values generally above 70%) from presently available VLDPEs (CDBI values generally less than 55%).

Homogeneous ethylene/α-olefin copolymers also typically exhibit an essentially single melting point with a peak melting point ($T_m$), as determined by differential scanning calorimetry (DSC), of from about 60° to 105° C., more precisely a DSC peak $T_m$ of from about 80° to 100° C. As used herein, the phrase "essentially single melting point" means that at least about 80% (by weight) of the material corresponds to a single $T_m$ at a temperature within the range of from about 60° C. to 105° C., and essentially no substantial fraction of the material has a peak melting point in excess of about 115° C. as determined by DSC analysis (e.g., on a Perkin Elmer™ System 7 Thermal Analysis System). The presence of higher melting peaks has been found to be detrimental to film properties such as haze and seal initiation temperature.

Homogeneous ethylene/α-olefin copolymers can, in general, be prepared by the copolymerization of ethylene and one or more α-olefins. Preferably, the comonomer is a $C_3$–$C_{20}$ α-olefin, more preferably, a $C_4$–$C_{12}$ α-olefin, still more preferably, a $C_4$–$C_8$ α-olefin. Particularly preferred α-olefins include 1-butene, 1-hexene, 1-octene, and mixtures thereof. Processes for preparing and using homogeneous polymers are disclosed in U.S. Pat. Nos. 5,206,075 and 5,241,031 as well as PCT International Publication Nos. WO 93/03093 and WO 90/03414. Another species of homogeneous ethylene/α-olefin copolymer is disclosed in U.S. Pat. Nos. 5,272,236 and 5,278,272, both of which are hereby incorporated by reference. In general, an ethylene/α-olefin copolymer is the polymerization product of from about 80 to 99 weight percent ethylene and from 1 to 20 weight percent α-olefin, preferably, from about 85 to 95 weight percent ethylene and from 5 to 15 weight percent α-olefin.

Turning now to the film of the present invention, the PVDC-containing layer is derived from a blend that contains three components. The first of these components is a vinylidene chloride-containing polymer, i.e., a polymer that includes mer units derived from vinylidene chloride, $CH_2=CCl_2$. Such polymers also can include mer units derived from monomers such as, for example, vinyl chloride, styrene, vinyl acetate, acrylonitrile, and $C_1$–$C_{12}$ alkyl esters of (meth)acrylic acid (e.g., methyl acrylate, butyl acrylate, methyl methacrylate, etc.). Preferably, the first component includes one or more of vinylidene chloride homopolymer, vinylidene chloride/vinyl chloride copolymer, vinylidene chloridelmethyl acrylate copolymer, vinylidene chloride/acrylonitrile copolymer, vinylidene chloridelbutyl acrylate copolymer, vinylidene chloride/styrene copolymer, and vinylidene chloride/vinyl acetate copolymer. Such polymers are commercially available from a variety of sources.

The second component of the blend is a processing aid polymer that contains mer units derived from a $C_1$–$C_{12}$ alkyl ester of (meth)acrylic acid and mer units derived from one or more monomers having the general formula $CH_2=CR^1C(O)R^2$. In this formula, $R^1$ preferably is H or $CH_3$, although other useful organic moieties (e.g., $CH_2CH_3$, $CH_2C(O)OH$, etc.) can be envisioned by those of ordinary skill in the art. Where $R^1$ is limited to H or $CH_3$ and $R^2$ is OH, the monomer is (meth)acrylic acid; where $R^1$ is limited to H or $CH_3$ and $R^2$ is $O(CH_2)_nR^3$ in which n is an integer from 1 to 8 inclusive and $R^3$ is an amino, hydroxyl, or oxirane group, the monomer is an alkylamino (meth)acrylate, a hydroxyalkyl (meth)acrylate, or a glycidyl (meth)acrylate, respectively; and where $R^1$ is limited to H or $CH_3$ and $R^2$ is $NH(CH_2)_nOH$ in which n is defined as before, the monomer is a (meth) acrylamide. In the foregoing, n is preferably an integer from 1 to 4 inclusive, more preferably an integer from 1 to 2 inclusive. Particularly preferred processing aid polymers are those that include mer units derived from a $C_1$–$C_{12}$ alkyl ester of methacrylic acid, particularly those that include mer units derived from a $C_1$–$C_4$ alkyl ester of methacrylic acid (i.e., methyl methacrylate, ethyl methacrylate, propyl methacrylate, and butyl methacrylate).

The second component (i.e., the processing aid polymer) can be prepared by methods well known in the art. Specifically, if the comonomer of choice is (meth)acrylic acid, it can be polymerized directly with the desired $C_1$–$C_{12}$ alkyl ester of (meth)acrylic acid. If the comonomer is another of the above-listed compounds, it can be ordered from a commercial supplier (e.g., Aldrich Chemical Co., Inc.; Milwaukee, Wis.) or can be prepared by reacting (meth)acrylic acid with a compound that yields the desired $R^2$ group. Such reactions and methods for carrying them out are well known to a chemist of ordinary skill, and the interested reader is directed to, e.g., any of a variety of undergraduate level textbooks further details.

The third component of the blend is a compound that can prevent or inhibit the degradation of PVDC, i.e., an HCl scavenger or a dienophile. Mer units derived from vinylidene chloride have the general formula —$CH_2CCl_2$—. Such mer units can, under certain circumstances (particularly where several such units are contguous to one another), undergo a reaction whereby HCl is eliminated as a byproduct and unsaturated mer units, i.e., —CH=CCl—, are formed.

Certain substances can help to inhibit the dehydrochlorination of PVDC. Broadly, these substances can be classified as HCl scavengers and dienophiles. An HCl scavenger is any substance capable of accepting HCl as it forms during dehydrochlorination of PVDC copolymers. Examples of useful HCl scavengers include tetraethylene glycol di(2-ethylhexoate), soaps of fatty acids (e.g., calcium recinoleate), metal salts of organic acids (e.g., tetrasodium pyrophosphate), and organic compounds which include an oxirane (i.e., epoxy) group such as, for example, epoxidized linseed oil, epoxidized soybean oil, epoxidized α-olefins, epoxidized esters, glycidyl ethers, etc.

A dienophile is a compound capable of reacting with conjugated diene sequences such as those found in, e.g., 1,3-butadiene. This helps to retard propagation of the aforementioned dehydrochlorination reaction. Examples of useful dienophiles include polymers comprising mer units derived from one or more anhydrides of organic diacids such as, for example, maleic acid, fumaric acid, and succinic acid. Preferably, the dienophile is at least one of ethylene/butyl acrylate/maleic anhydride copolymer and ethylene/vinyl acetate/graft maleic anhydride copolymer.

Preferably, the first component of the blend is present in an amount of from about 92 to 98 weight percent, the second component is present in an amount of from about 1 to 4 weight percent; and the third component is present in an amount of from about 1 to 4 weight percent. Such a blend can, in most cases, maintain or improve the thermal stability of the composition compared with a composition of 4% (by wt.) epoxidized oil and 96% (by wt.) vinylidene chloride copolymer.

Regardless of the individual amounts used, the three components of the blend can be mixed in, for example, a blender or extruder. Once mixed, the blend can be extruded and processed in any of a number of methods known to those of ordinary skill in the art so as to form a film or a layer of a multilayer film. For example, the methods disclosed in U.S. Pat. No. 3,741,253 (Brax et al.), U.S. Pat. No. 4,278,738 (Brax et al.), and U.S. Pat. No. 4,284,458 (Schirmer) the teachings of which are incorporated herein by reference. Of course, virtually any method of making a film having an $O_2$-barrier layer can be used to make a film in accordance with the present invention, so long as the method utilizes an above-described PVDC-containing composition.

This blend offers the advantage of improved thermal stability of the PVDC and, hence, improved extrudability. In other words, the PVDC can be extruded through an extruder for a longer period before the extrusion process must be interrupted for the purpose of removing degraded PVDC from inside the extruder. Moreover, since the blend also provides greater $O_2$-barrier per amount of PVDC present, the amount of PVDC can be reduced to match a preexisting degree of $O_2$-barrier, and/or the degree of $O_2$-barrier can be increased for a given amount of PVDC.

Determination of the overall thermal stability of PVDC blends can be carried out by working the blend between a pair of heated rollers or inside a heated mixing chamber. The time required to produce a noticeably blackened polymer due to shear degradation and temperature-induced degradation is a measure of the effectiveness of the processing aid/HCl scavenger combination in promoting heat stability of the PVDC. Commercially acceptable vinylidene chloride copolymer blends show thermal stability times of about 10 minutes in a mixing device such as a Brabender™ blender running at about 168° C. (335° F.) and 63 revolutions per minute.

Although the film of the present invention can include just a single layer (i.e., a layer derived from the above-described blend), it preferably includes at least two layers. Preferably, the film of the present invention has a total of from 1 to 20 layers, more preferably from 2 to 12 layers, most preferably from 3 to 10 layers. The multilayer film of the present invention can have any total number of layers and any total thickness desired as long as the film provides the desired properties for the particular packaging operation in which the film is used, e.g., $O_2$-barrier characteristics, free shrink, shrink tension, optics, modulus, seal strength, etc.

A preferred multilayer film structure according to the present invention has at least four layers. Such a film includes a seal layer, a bulk layer, an $O_2$-barrier layer derived from the above-described blend, and an abuse layer. The bulk layer preferably is disposed between the seal layer and the $O_2$-barrier layer, and the $O_2$-barrier layer preferably is disposed between the bulk layer and the abuse layer. If desired, tie layers can be disposed between the seal layer and the bulk layer as well as between the $O_2$-barrier layer and the abuse layer. Such a film preferably has a total free shrink, at about 85° C., of from about 10 to 100%.

The four- and six-layer film structures just described can have the abuse layer as an outer layer. In such a structure, a preferred abuse layer contains a polymer including mer units derived from ethylene and, optionally, mer units derived from at least one of a $C_4$–$C_{12}$ α-olefin, vinyl acetate, (meth)acrylic acid, and a $C_1$–$C_{12}$ alkyl ester of (meth)acrylic acid. Particularly preferred ethylene-containing polymers include LDPE, LLDPE, VLDPE, homogeneous ethylene/α-olefin copolymers, and ionomers.

Alternatively, the abuse layer can be an inner layer. In such a structure, a skin layer can be included on the side of the abuse layer opposite the $O_2$-barrier layer. If desired, tie layers can be disposed between the bulk layer and the $O_2$-barrier layer as well as between the $O_2$-barrier layer and the abuse layer. Such a film structure preferably has a total free shrink, at about 85° C., of from about 1 to 9%.

In the five- and seven-layer film structures just described, a preferred skin layer contains a polymer including mer units derived from ethylene and, optionally, mer units derived from at least one of a $C_4$–$C_{12}$ α-olefin, vinyl acetate, (meth)acrylic acid, and a $C_1$–$C_{12}$ alkyl ester of (meth)acrylic acid. Particularly preferred ethylene-containing polymers include LDPE, LLDPE, VLDPE, homogeneous ethylene/α-olefin copolymers, and ionomers.

Preferably, the seal layer in the previously described film structures contains a polymer including mer units derived from ethylene and, optionally, mer units derived from a $C_4$–$C_{12}$ α-olefin, vinyl acetate, (meth)acrylic acid, and a $C_1$–$C_{12}$ alkyl ester of (meth)acrylic acid. Particularly preferred ethylene-containing polymers include LDPE, LLDPE, VLDPE, homogeneous ethylene/α-olefin copolymers, and ionomers.

All or a portion of the film of the present invention can be irradiated to induce crosslinking. In the irradiation process, the film is subjected to an energetic radiation treatment, such as corona discharge (see, e.g., U.S. Pat. Nos. 4,120,716 and 4,879,430, the teachings of which are incorporated herein by reference), plasma, flame, ultraviolet, X-ray, gamma ray, beta ray, and high energy electron treatment, which induces crosslinking between molecules of the irradiated material. The proper dosage level can be determined by standard dosimetry methods known to those of ordinary skill in the art, and the precise amount of radiation to be used is of course dependent on the particular film structure and its end use. Preferably, the film is irradiated at a level of from 0.5–15 megarads (MR), more preferably 1–12 MR. Further details on the irradiation of polymeric films can be found in, for example, U.S. Pat. No. 4,064,296 (Bornstein et al.), the teaching of which is incorporated herein by reference.

The film layer comprising PVDC preferably is not irradiated. Irradiation, especially above about 4 MR, can cause significant degradation of PVDC. As is known to those of skill in the art, the use of a polymer comprising mer units derived from vinylidene chloride and methyl acrylate reduces the degrading effect of irradiation on the PVDC.

Preferably, the film of the present invention is oriented, more preferably biaxially oriented. Preferably, the film is both biaxially oriented and heat shrinkable. A film that is oriented has been elongated, generally at an elevated temperature (i.e., the orientation temperature), then "set" in the elongated configuration by cooling. This combination of elongation at elevated temperature followed by cooling causes an alignment of the polymer chains to a more parallel configuration, thereby dramatically altering the mechanical properties of the film. When an unrestrained, unannealed, oriented film subsequently is heated to its orientation temperature, the film shrinks almost to its original, i.e., pre-elongation, dimensions. Such a film is said to be heat shrinkable.

Often, the term "orientation ratio" (i.e., the product of the extent to which a film is oriented in several directions, usually two directions perpendicular to one another) is used when describing the degree of orientation of a given film. Orientation in the machine direction is referred to as "drawing", whereas orientation in the transverse direction is referred to as "stretching". For films extruded through an annular die, stretching is obtained by blowing the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls.

The film according to the present invention is particularly useful in the production of bags for packaging fresh red meat, smoked and processed meat, pork, cheese, poultry, and the like, as described in e.g. U.S. Pat. No. 3,741,253 (Brax et al.), U.S. Pat. No. 3,891,008 (D'Entremont), U.S. Pat. No. 4,048,428 (Baird), and U.S. Pat. No. 4,284,458 (Schirmer), each of which is incorporated herein by reference. However, the film can also be used in other applications.

For example, the film can be used as a shrink film in packaging applications for packaging food and non-food items. Films in which the present invention can be beneficially used are described in, e.g., U.S. Pat. Nos. 4,551,380 and 4,643,943 (both to Schoenberg), the teachings of which are incorporated herein by reference.

The present invention also can be used with films having oxygen, moisture, or odor barrier functionality, as described in, for example, U.S. Pat. No. 4,064,296 (Bornstein et al.), U.S. Pat. No. 4,724,185 (Shah), U.S. Pat. No. 4,839,235 (Shah), and U.S. Pat. No. 5,004,647 (Shah), each of which is incorporated herein by reference. The film also can be used as or in connection with a patch as disclosed in, for example U.S. Pat. Nos. 4,755,403 and 4,770,731 (both to Ferguson), each of which is incorporated herein by reference. Also, the film can be used as or in connection with irradiated, oriented, heat set films.

Additionally, the film of the invention can be laminated, adhesively adhered, extrusion coated, or extrusion laminated onto a substrate to form a laminate. Lamination can be accomplished by joining layers with adhesives, joining with heat and pressure, and even spread coating and extrusion coating.

The film of the present invention is especially suitable for packaging applications in which the product(s) being packaged preferably is to be protected from atmospheric $O_2$. More particularly, film according to the present invention is especially useful as a stretch film, as a film suitable for vertical or horizontal form-fill-and-seal end use, as a lidstock film, as a film suitable for vacuum skin packaging, as a suitable for use as a barrier bag, as a film suitable for use as a patch bag, as a film suitable for use in case ready packaging, as a film suitable for use in a thermoformed container (particularly in a film used as a liner in a thermoformed tray, such as a polystyrene tray), as an aroma/odor barrier film, as a film suitable for use in cook-in end use applications (especially heat shrinkable bags, heat-shrinkable and non-heat shrinkable casings, and containers thermoformed from non-heat shrinkable films and sheets), as a medical film, and many other packaging application in which it is desired to have an $O_2$-barrier generally.

EXAMPLE

Two compositions suitable for use in film manufacture are prepared and tested for thermal stability. The first composition is a control composition, and the second composition is a composition in accordance with the present invention. Both compositions are suitable for processing through an extruder for the manufacture of a film.

Table I, below, provides: (a) the identity of the various components present in each of the two compositions; (b) the amount of each of the components in each of the compositions; (c) the thermal stability of the compositions upon working the composition in a mixing chamber such as a BRABENDER™ blender running at 335° F. and 63 revolutions per minute, with the results being provided in terms of the time required to produce a noticeably blackened polymer due to shear-degradation and temperature-induced-degradation, and (d) the relative $O_2$-transmission rate obtained in a film utilizing the composition.

As can be seen in Table I, the control composition, which lacks a processing aid copolymer, has a thermal stability only about half that of the thermal stability of the composition in accordance with the invention, which contains an acrylate ester/carboxylic acid processing aid copolymer. Moreover, the $O_2$-transmission rate which is provided by the composition according to the present invention is only about half of the $O_2$-transmission rate of the control composition.

TABLE I

| Composition | Components in Composition | Amount of Component (parts by wt.) | Thermal Stability (min) | OTR ($cm^3$/day $m^2$ atm) |
|---|---|---|---|---|
| Processing aid polymer not included (control) | PVDC<br>HCl Scavenger and/or Dienophile | 100<br>4 | 10 | 7 |
| Processing aid polymer included | PVDC<br>Acrylate Ester/Carboxylic Acid Processing Aid Copolymer<br>HCl Scavenger &/or Dienophile | 100<br>2<br><br><br>2 | 20 | 3 |

Although the present invention has been described in connection with certain preferred embodiments, modifications and variations that do not depart from the principles and scope of the invention may be easily envisioned by those skilled in the art. Accordingly, such modifications may be practiced within the scope of the following claims.

I claim:

1. A film comprising:
   a) a seal layer;
   b) a bulk layer;
   c) an $O_2$-barrier layer derived from a blend comprising
      1) a polymer comprising mer units derived from vinylidene chloride,
      2) a processing aid polymer which is the polymerization product of a $C_1$–$C_{12}$ alkyl ester of (meth)acrylic acid and one or more monomers having the general formula $CH_2CR^1C(O)R^2$ wherein $R^1$ is H or $CH_3$ and $R^2$ is
         (a) $O(CH_2)_nR^3$, or
         (b) $NH(CH_2)_nOH$, in which n is an integer from 1 to 8 inclusive and $R^3$ is an amino, hydroxyl, or oxirane group, and
      3) at least one of an HCl-scavenging compound and a dienophile; and
   (d) an abuse layer;
said bulk layer being disposed between said $O_2$-barrier layer and said seal layer and said $O_2$-barrier layer being disposed between said bulk layer and said abuse layer.

2. The film of claim 1 wherein said abuse layer is an outer layer.

3. The film of claim 2 wherein said abuse layer comprises a polymer comprising mer units derived from ethylene and, optionally, mer units derived from at least one of a $C_4$–$C_{12}$ α-olefin, vinyl acetate, (meth)acrylic acid, and a $C_1$–$C_{12}$ alkyl ester of (meth)acrylic acid.

4. The film of claim 2 wherein further comprising:
   e) a tie layer disposed between said seal layer and said bulk layer, and
   f) a tie layer disposed between said $O_2$-barrier layer and said abuse layer.

5. The film of claim 1 wherein said abuse layer is an inner layer.

6. The film of claim 5 further comprising:

e) a skin layer on the side of said abuse layer opposite said $O_2$-barrier layer;

f) a tie layer disposed between said bulk layer and said $O_2$-barrier layer; and g) a tie layer disposed between said $O_2$-barrier layer and said abuse layer.

7. The film of claim 6 wherein said skin layer comprises a polymer comprising mer units derived from ethylene and, optionally, mer units derived from ethylene further comprises mer units derived from at least one of a $C_4$–$C_{12}$ α-olefin, vinyl acetate, (meth)acrylic acid, and a $C_1$–$C_{12}$ alkyl ester of (meth)acrylic acid.

8. The film of claim 1 wherein said seal layer comprises a polymer comprising mer units derived from ethylene and, optionally, mer units derived from ethylene further comprises mer units derived from at least one of a $C_4$–$C_{12}$ α-olefin, vinyl acetate, (meth)acrylic acid, and a $C_1$–$C_{12}$ alkyl ester of (meth)acrylic acid.

9. The film of claim 1 wherein said polymer comprising mer units derived from vinylidene chloride further comprises mer units derived from at least one of vinyl chloride, a $C_1$–$C_{12}$ alkyl ester of (meth)acrylic acid, acrylonitrile, styrene, and vinyl acetate.

10. The film of claim 1 wherein said processing aid copolymer is present in an amount of from about 1 to 4 weight percent, based on the weight of said blend.

11. The film of claim 1 wherein said processing aid polymer comprises a $C_1$–$C_{12}$ alkyl ester of methacrylic acid.

12. The film of claim 11 wherein $R^2$ is $O(CH_2)_n R^3$.

13. The film of claim 12 wherein n is an integer from 1 to 4 inclusive.

14. The film of claim 12 wherein $R^3$ is an amino group.

15. The film of claim 12 wherein $R^3$ is a hydroxyl group.

16. The film of claim 12 wherein $R^3$ is an oxirane group.

17. The film of claim 1 wherein $R^2$ is $NH(CH_2)_n OH$.

18. The film of claim 17 wherein n is an integer from 1 to 4 inclusive.

* * * * *